Oct. 31, 1961 G. C. MONACO Re. 25,072
APPARATUS FOR APPLYING PASTE TO A COMESTIBLE WAFER
Original Filed Aug. 28, 1957 2 Sheets-Sheet 1
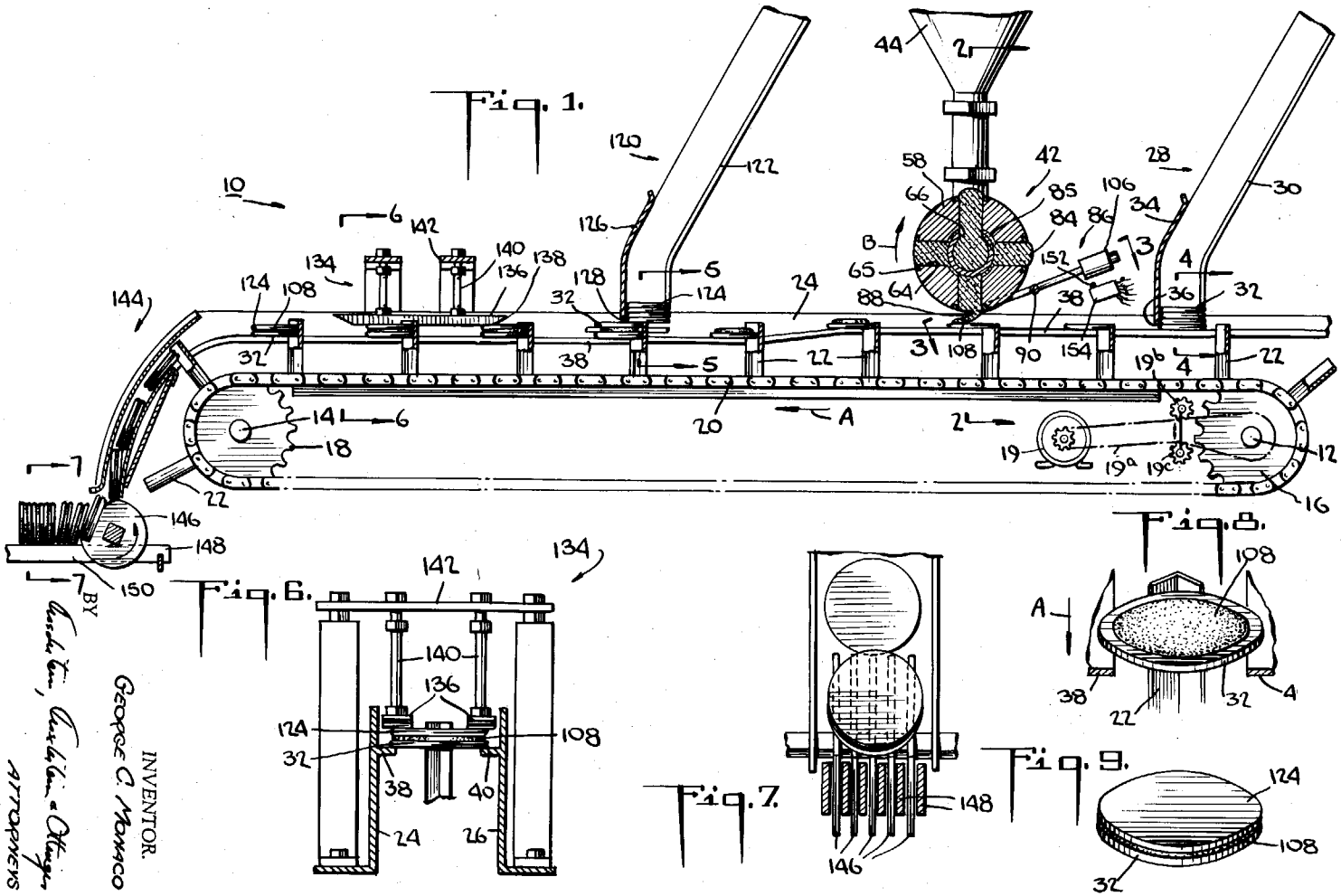
INVENTOR.
GEORGE C. MONACO
BY
Rosenstein, Rosenstein & Ottinger
ATTORNEYS APPARATUS FOR APPLYING PASTE TO A COMESTIBLE WAFER
Original Filed Aug. 28, 1957 2 Sheets-Sheet 2
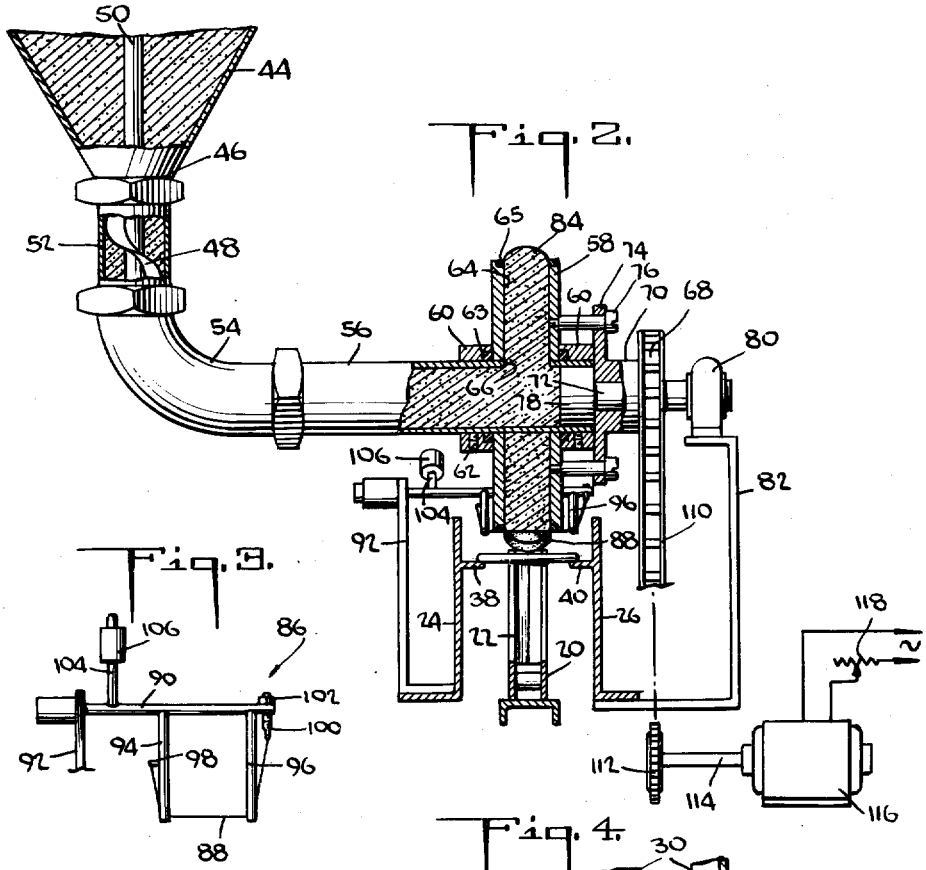
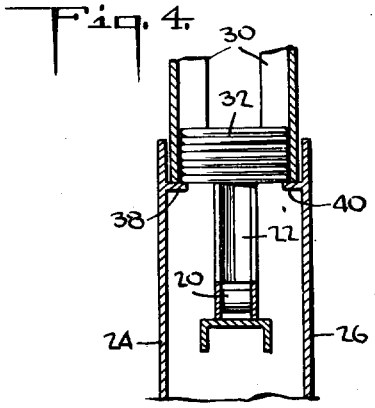
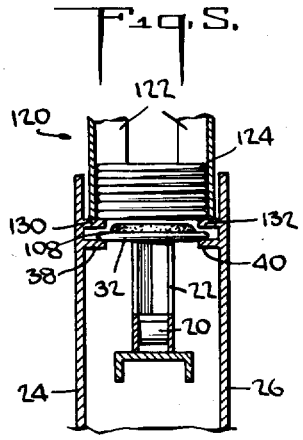
INVENTOR.
GEORGE C. MONACO
BY
Fischbein, Fischbein & Ottinger
ATTORNEYS United States Patent Office Re. 25,072
Reissued Oct. 31, 1961

25,072

APPARATUS FOR APPLYING PASTE TO A COMESTIBLE WAFER

George C. Monaco, Little Neck, N.Y.

Original No. 2,923,257, dated Feb. 2, 1960, Ser. No. 680,719, Aug. 28, 1957. Application for reissue May 1, 1961, Ser. No. 107,289
2 Claims. (Cl. 107—1)

Matter enclosed in heavy brackets [ ] appears in the original patent but forms no part of this reissue specification; matter printed in italics indicates the additions made by reissue.

This invention relates to an apparatus for applying paste to a comestible wafer. The term "paste" as employed herein denotes an edible semi-solid mixture which is flowable under pressure, but will substantially retain its own shape if in the form of layer or small mound. Examples of pastes are plain and flavored sugar creams, jams and marshmallow, such as are used for sweet fillings in cracker sandwiches, it being understood that the paste does not have to be sweet inasmuch as it may constitute a filling such as peanut butter. It also is pointed out that the term "paste" as used herein embraces paste-like materials of the kind above mentioned in which there are incorporated chunks of solid comestibles as, for instance, chunks of fruit or nuts. The term "cracker" as used hereinafter denotes one or more leavened or unleavened, sweet or unsweetened wafers having paste on one or both surfaces thereof.

It is an object of my invention to provide an apparatus of the character described which [are] *is* speedy and efficient and will produce a neat and attractive cracker.

It is another object of my invention to provide an apparatus of the character described which will locate a deposit of paste accurately on a wafer.

It is another object of my invention to provide an apparatus of the character described which [are] *is* capable of producing either sandwich-type crackers or crackers consisting simply of a wafer with an exposed deposit of paste thereon.

It is another object of my invention to provide an apparatus of the character described which comprises relatively few and simple parts and is entirely automatic in operation.

Other objects of my invention in part will be obvious and in part will be pointed out hereinafter.

My invention accordingly consists in the features of construction, combinations of elements, arrangements of parts and series of steps which will be exemplified in the apparatus hereinafter described and of which the scope of application will be indicated in the appended claims.

In the accompanying drawings in which is shown one of the various possible embodiments of my invention:

FIG. 1 is a longitudinal sectional view through an apparatus constructed in accordance with my invention;

FIG. 2 is an enlarged vertical sectional view through the paste applicator station, the same being taken substantially along the line 2—2 of FIG. 1;

FIG. 3 is an auxiliary view taken substantially along the line 3—3 of FIG. 1 and illustrating the cut-off knife mechanism employed at the paste applicator station;

FIG. 4 is an enlarged sectional view taken substantially along the line 4—4 of FIG. 1 and illustrating the first wafer delivery station;

FIG. 5 is an enlarged sectional view taken substantially along the line 5—5 of FIG. 1 and illustrating the second wafer delivery station;

FIG. 6 is an enlarged sectional view taken substantially along the line 6—6 of FIG. 1 and illustrating the pressure station at which the paste layer is lightly squeezed between the upper and lower wafers of a sandwich;

FIG. 7 is an auxiliary view taken substantially along the line 7—7 of FIG. 1 and illustrating the exit station;

FIG. 8 is a perspective view of a detail of the apparatus, the same showing a pusher at a point between the paste applicator station and the second wafer delivery station; and FIG. 9 is a perspective view of a finished sandwich.

Referring now in detail to the drawings, the reference numeral 10 denotes an apparatus constructed in accordance with my invention. Said apparatus includes a drive shaft 12 and an idler shaft 14 on which are mounted, respectively, sprockets 16, 18. The two shafts are horizontal and coplanar. The shaft 12 is rotated by a suitable mechanism as, for example, an electric motor 19. Preferably this shaft is turned at a constant low speed. The two shafts are suitably journalled in a framework which, for the sake of clarity, has been omitted from the drawings. Said motor has a sprocket on its output shaft which engages a chain 19a that is trained about a sprocket (not shown) on the drive shaft 12. The chain 19a is overly long and the slack therein is taken up by a pair of idler sprockets 19b and 19c. The upper idler sprocket 19b rides on the outside of one reach of the chain 19a and the other idler sprocket 19c rides on the outside of the other reach of the chain 19a, the two idler sprockets being equidistant from the drive shaft 12. Suitable adjusting means (not shown) is included to draw the two idler sprockets 19b, 19c toward one another sufficiently to take up the slack in the chain 19a. Moreover, both said idler sprockets are mounted on a common frame (not shown) which is shiftable in a direction perpendicular to an imaginary line between the axes of rotation of the sprocket on the mtor 19 and the sprocket driven thereby on the drive shaft 12. Additionally, means such as a lead screw and nut, the latter being secured to the frame which carries the two idler sprockets, is included to shift both said sprockets simultaneously thereby to decrease the slack in one of the reaches of the chain 19a while concurrently increasing the slack in the other reach or vice versa. The reason for this movement will be described in detail hereinafter.

A link conveyor chain 20 is trained about the sprockets thereby providing an upper and a lower horizontal reach. At uniformly spaced intervals the chain is provided with pushers 22 which are so fastened to the chain as to extend upwardly from the top reach and downwardly from the lower reach. All the pushers are identical and each consists of an elongated metal rod of angle-shaped cross section. As best shown in FIG. 8, the inner faces of the two flanges which together form the angle shape face in the direction of movement of the chain, this being indicated by the arrow A in FIG. 1. All the pushers are of the same length.

When the pushers are on the upper reach of the chain they move between a pair of parallel upstanding walls 24, 26 symmetrically disposed on opposite sides of the upper reach and extending, therefore, longitudinally of the apparatus. The upper edges of the walls are located above the tips of the pushers. Thus, the walls define a channel between which the pushers move, the walls being spaced from one another a distance greater than the width of the largest wafer to be handled in the apparatus.

The apparatus further includes a first wafer delivery station 28 which comprises a chute 30 that is substantially vertical and preferably slopes slightly in a rearward direction as best seen in FIG. 1. Said chute constitutes a skeletonized back wall and a pair of side walls which receive and guide a stack of wafers 32 downwardly toward the channel defined by the walls 24, 26. The wafers in said chute are horizontally disposed. Near the bottom of the chute I provide a front wall 34 which prevents the wafers from moving forwardly in the direction of movement A of the pushers. This front wall terminates at a bottom edge 36.

The side walls 24, 26 support a pair of inwardly extending flanges 38, 40 which are horizontally coplanar, and as best can be seen in FIG. 2 provide inwardly extending ledges which are adapted to support wafers moved forwardly out of the chute 30 by the pushers. The ledges are disposed at such a horizontal level in the vicinity of the first wafer delivery station that they are spaced below the bottom edge 36 of the wall 34 a distance slightly in excess of the height of a single wafer and less than the height of two wafers.

In operation of the apparatus the lowermost wafer 32 in the delivery chute rests on the ledges 38, 40 the center of the wafer bridging the span between said ledges. When a pusher sweeps past the first wafer delivery station, it will engage and start to move only the lowermost wafer in the stack. The lengths of the pushers are such that the tip of any pusher engaging the bottom wafer in the delivery chute 30 will clear the next uppermost wafer. Moreover, advance movement of the next to the bottom wafer, due to frictional engagement with the bottom wafer, is prevented by the front wall 34 which such next to the bottom wafer engages at this time.

It further will be noted that, due to the dihedral angle of the walls of the pusher, the central location of the pusher between the ledges 38, 40, and the symmetrical disposition of the dihedral angle with respect to the channel, when round wafers 32 are fed into the apparatus, they automatically are centered in the dihedral angle upon engagement with the pusher. However, it should be mentioned that the apparatus is not to be limited to employment with round wafers as it will function with equal facility on other shapes of wafers, e.g., oval and rectangular wafers.

The ledges 38, 40 run forwardly from the first wafer delivery station to a paste applicator station 42 which constitutes the principal feature of my invention. Desirably, although not necessarily, the ledges maintain the same horizontal level from the first wafer delivery station to and past the applicator station so that the wafers travel in a single horizontal plane to and beyond the applicator station while being moved at uniform speed and at a uniform predetermined spacing by the pushers.

The novel paste applicator station comprises a conical hopper 44 in which the paste material is disposed. As noted earlier, the paste material consists of a flowable semi-solid material such, for instance, as creams, sugar pastes, marshmallow, peanut butter, jams etc. and variegated mixtures thereof, and, optionally, may include small chunks of solid materials like nuts, fruits and berries. The hopper terminates in a lower orifice 46 through which the paste is propelled by a helical feed screw 48 mounted on a vertical shaft 50 and suitably rotated by a driving mechanism (not shown), e.g., an electric motor, the shaft being centered in the hopper. The orifice 46 is connected, as by a short length of vertical tubing 52 in which the feed screw 48 is snugly rotatable, to an elbow 54 that leads to a horizontal conduit 56 extending transversely across the channel defined by the walls 24, 26 and, therefore, transversely across the paths of travel of the wafers advanced through the apparatus by the pushers.

A rotary extrusion plate 58 turns on the conduit 56 which serves as a journal therefor. Said plate turns between a pair of collars 60 secured as by set screws 62 to the conduit, said collars being hollowed to receive glands 63 that prevent leakage of the paste. The plate is of circular peripheral configuration and is provided with a series, e.g., four, of radially extending passageways 64 that extend from the interior bore of the plate where it rotatably engages the conduit to the external periphery of said plate. Optionally, although not necessarily, the passageways are of uniform transverse contour throughout their lengths. The outer terminal of each passageway is of the shape of the paste material which it is desired to deposit upon the lower wafer taken from the first delivery station 28. This usually will be circular, although it is within the scope of my invention to form said outer terminals to match the configuration of the wafers being handled in the apparatus; for instance, if the apparatus is making peanut butter sandwiches and utilizing square soda crackers for the top and bottom of the sandwich, the passageways 64 may have outer square terminals which will, however, be smaller in length and width than the soda crackers of the sandwich. In the preferred form of my invention shown herein, the desired configuration is given to the outer terminal of each passageway 64 by providing the outer end of said passageway with an insert plate 65 suitably held in a matching recess in the plate 58 as by means of screws.

The inner terminals of the passageways 64 sweep around the periphery of the conduit 56 in a common path in the direction of the arrow B, and at a point in this path the conduit is formed with an opening 66. An excellent location for this opening is the top of the conduit. However, I do not wish to be limited thereto, since it soon will be seen that said opening can be provided anywhere on the conduit (within the paths of travel of the inner terminals of the passageways 64) beyond, rather than just before, the bottom of the extrusion plate 58 in the direction B of movement of said plate. The bottom of the extrusion plate is located directly above and only a short distance from, e.g., one-quarter or one-eighth of an inch, the path of travel of wafers moved through the apparatus by the pushers, the outer terminals of the passageways 64 being centered on such path of travel.

The extrusion plate 58 is turned by a sprocket 68 which is fixed to a collar 70 rotatable on a shaft 72. Said collar carries radial arms 74 that are fastened in any suitable manner, e.g., by bolts 76, to a side of the extrusion plate whereby said plate rotates as a unit with the sprocket. The shaft 72 is supported at one end on a plug 78 wedged in and closing the outer end of the conduit 56 and at its other end in a bearing 80 carried by a bracket 82 fastened to the framework of the apparatus.

It will be appreciated that, as the extrusion plate turns, each time the inner terminal of one of the passageways 64 crosses the conduit opening 66, a quantity of paste will be expressed into such passageway due to the pressure exerted by the feed screw 48. The amount of material thus expressed will depend upon the design and rate of rotation of the feed screw which can be varied in any manner well known to the art as, for instance, by driving the shaft 50 of said feed screw by an electric motor the speed of which can be varied by adjustment of a rheostat. Due to the introduction of extra paste into this passageway, an equal amount of paste will be extruded from the outer terminal of said passageway this extruded paste being indicated by the reference numeral 84 (see FIGS 1 and 2). As the extrusion plate turns, the extruded paste will descend along with the plate until it is directly above the paths of travel of the wafers.

In the preferred form of my invention, to prevent undue strain on the extrusion parts occasioned by complete cutoff of paste flow when the passageways 64 are disaligned with the conduit opening 66, I provide a circumferential restricted relief passageway 85 which connects the inner terminals of all the passageways 64 to said opening 66 whereby a limited flow of paste will take place even when no passageway 64 is aligned with said conduit opening. This flow is so slight as not materially to affect the measured extrusion of paste on each of the wafers but by relieving stress imparted due to turning of the feed screw greatly lengthens the life of the apparatus.

The paste applicator station further includes a cutoff knife mechanism 86 (see FIGS 1 and 3) which essentially consists of a fine taut wire 88 lying across the extrusion plate and riding on its outer periphery so as to be in abutment therewith and thereby closely to traverse the outer terminals of the extrusion passageways 64 as the plate turns. The wire is positioned at the bottom of the extrusion plate thereby to cut off the extruded paste 84 as it reaches the lowest point of its descent while still carried by the extrusion plate.

Said wire is carried in a frame comprising a horizontal shaft 90 that is journalled in a vertical plate 92 suitably secured to the framework of the apparatus. The shaft 90 is in back of the extrusion plate, that is to say, between the extrusion plate and the first wafer delivery station. A pair of parallel arms 94, 96 extend away from said shaft 90 toward the bottom of the extrusion plate. The arm 94 mounts an anchor pin 98 to which one end of the wire 88 is affixed. Said wire is threaded through an opening in the tip of the arm 94 and through a registered opening in the tip of the arm 96, the other end of said wire being attached to the end of a threaded rod 100 which extends freely through the shaft 90. A nut 102 screwed on the rod 100 will, when turned, tighten or loosen the wire 88. This nut is so regulated as to maintain the wire 88 taut between the arms 94, 96. A radial post 104 mounted on the shaft 90 carries a weight 106. Said post extends away from the shaft 90 in a direction opposite to the wire arms 94, 96 and thereby will bias the wire against the bottom of the extrusion plate.

It now will be appreciated that as the extrusion plate turns, the extruded paste 84 will be cut away from the outer terminal of its associated passageway 64 while it passes the wire 88 thereby forming a layer 108 of paste which is free to descend from the extrusion plate.

A chain 110 is trained about the sprocket 68 and also about another sprocket 112 which is secured to the output shaft 114 of a motor 116. The motor derives its energy from a suitable source of electric power and the speed thereof is controlled by a rheostat 118. The speed of the motor is so regulated that the peripheral speed of the extrusion plate exactly matches the linear rate of travel of the link conveyor chain 20 and, therefore, of the pushers 22 and the wafers 32, it being noted that the direction of travel of the bottom of the plate is the same as that of the wafers. Moreover, the apparatus is so adjusted that the outer terminals of the extrus ion passageways 64 and the wafers 32 being advanced by the pushers are synchronized; that is to say, a layer 108 of paste is severed from an extrusion passageway as a wafer passes below the outer terminal of such passageway. Preferably, the synchronization is such that the leading edge of the paste layer 108 will fall slightly in back of the leading edge of the wafer passing below the extrusion plate as the wire begins to cut the extruded paste 84. Thereafter, as this extruded paste is further cut by the knife upon continued revolution of the extrusion plate, the remainder of the layer will gradually deposit upon such wafer, it being noted that since the speed of the layer and the speed of the wafer are exactly matched, the layer is deposited in the shape in which it is cut and is neither stretched nor compressed. In this manner, wafer after wafer will have uniformly deposited thereon a paste layer which is nicely centered on the wafer as it passes beneath the paste applicator station. In FIG. 8 I have shown the appearance of the wafer shortly after it has left the paste applicator station and is being advanced by a pusher along the ledges 38, 40 to the next operation.

The foregoing synchronization is obtained by the simultaneously shiftable idler sprockets 19b and 19c; that is to say, by increasing or decreasing the slack in one or the other of the reaches of the chain 19a while at the same time decreasing or increasing the slack in the other reach, the angular position of the shaft 12 at any given time will be slightly shifted and thereby the relative relationship between the pushers 22 and the passageways 64 can be adjusted to secure the desired synchronization.

It may be mentioned at this point that, if desired, the layer 108 need not be matched in configuration to the wafer on which it is deposited. For example, when a comparatively soft paste is being applied, it often is desirable simply to deposit the extruded paste as a dollop, i.e., a mound, at the center of the wafer, this material subsequently, as soon will be seen, being squeezed out toward the periphery of the wafer. However, I prefer to cut and deposit a paste layer which approximately matches the contour although not the dimensions of the lower wafer, and this arrangement is particularly desirable in certain types of crackers as, for example, where no top wafer subsequently is to be placed over the paste.

The apparatus further includes a second wafer delivery station 120 which is utilized when a sandwich-type cracker is to be made. The ledges 38, 40 run forwardly from the paste applicator station to the second wafer delivery station. However, at a point intermediate said stations, the ledges incline downwardly by an amount preferably slightly more than the combined thicknesses of the first wafer and the paste layer 108. By the time the ledges have reached the second paste applicator station, they again are horizontal and remain so as they pass beneath said station.

The second wafer delivery station, like the first one, comprises a chute 122 that is substantially vertical and preferably slopes slightly in a rearward direction as best can be seen in FIG. 1. Said chute constitutes a skeletonized back wall and a pair of side walls which receive and guide a stack of wafers 124 downwardly toward the channel defined by the walls 24, 26. The wafers in said chute are horizontally disposed. Near the bottom of the chute I provide a front wall 126 which prevents the wafers from moving forwardly in the direction of movement A of the pushers. This front wall terminates at a bottom edge 128.

In addition to the ledges 38, 40 the side walls 24, 26 at the second wafer delivery station support a pair of inwardly extending flanges 130, 132 which are horizontally coplanar and, as best can be seen in FIG. 5, provide inwardly extending ledges which are adapted to support wafers 124 moved forwardly out of the chute by the pushers. The ledges 130, 132 are disposed at such a horizontal level in the vicinity of the second wafer delivery station that they are spaced below the bottom edge 128 of the wall 126 a distance slightly in excess of the height of a single wafer and less than the height of two such wafers.

In operation of the apparatus the lowermost wafer 124 in the delivery chute 122 rests on the ledges 130, 132 the center of the wafer bridging the span between said ledges. The ledges 130, 132 support the lowermost wafer in the chute 122 at a level just above the top of the paste layer 108. When a pusher advancing a bottom wafer 32 on which a paste layer 108 has been deposited sweeps past the second biscuit delivery station 120, it will engage and start to move only the lowermost wafer in the stack. The height of the ledges 130, 132 is such that the tip of a pusher engaging the lowermost wafer in the second stack will clear the next to the bottom wafer in said stack but will firmly engage the lowermost wafer. Moreover, advance movement of the next to the bottom wafer, due to frictional engagement with the bottom wafer, is prevented by the front wall 126 which such next to the lowermost wafer engages at this time.

Thus, as a pusher moves under and away from the second wafer delivery station, it will advance a wafer with its paste filling riding on the ledges 38, 40 and simultaneously will advance an upper wafer 124 which is riding directly above the lower wafer and filling on the ledges 130, 132. The ledges 130, 132 terminate shortly beyond the second wafer delivery station so that as the upper wafer leaves these ledges it will gently rest on the paste filling.

Optionally at this time, i.e., after the deposit of the upper wafer on the paste layer to complete the sandwich, the cracker can be removed from the machine and packed. However, it often is desirable to gently squeeze the filling between the two wafers, and the apparatus, therefore, includes suitable means for effecting such operation. Said means comprises a pressure station 134. Essentially, said station simply consists of an elongated horizontal weight bar 136 the underside of the leading edge 138 whereof is upwardly sloped. The bar lies in the path of travel of the top wafer 124 of each sandwich now being advanced by the pushers and its lower edge is slightly below the top surface of such sandwich. Thus, as the sandwich engages the leading edge of the bar, the bar will ride up over the same and gently urge the upper wafer downwardly toward the lower wafer thereby lightly compressing the paste filling 108 sandwiched therebetween. To maintain the bar at its proper horizontal level, the bar is provided with a pair of upstanding rods 140 which are guided in overhead frames 142 the guiding being non-confining in a vertical direction so as not to unduly increase the weight to which the comparatively frail wafers are subjected during the squeezing operation.

The pushers now advance the finished sandwiches to an exit station 144 where any suitable stacking mechanism, such, for example, as that shown in my United States Letters Patent No. 2,358,413, issued September 19, 1944, for Stacking Machine, is provided. Said mechanism includes a standard stacking cam 146 consisting of plural cam plates operating between a grating 148, so as to receive the sandwiches as they turn around the sprocket 18 and transfer them in vertical position to a packing platform 150.

Desirably, the apparatus automatically will stop if the wire 88 breaks inasmuch as continued operation thereof in such case would smear paste over all the moving parts of the machine. To this end, I therefore provide a sensing element as, for example, the feeler 152 of a microswitch 154. Said feeler is located directly beneath the weight 106 when the latter is in the normal operating position it assumes when the wire is riding on the periphery of the extrusion plate 58. Hence, when the wire breaks and the weight drops, it will strike the feeler of the microswitch. The microswitch has several normally closed contacts which all are opened upon the feeler being engaged. One of these contacts is in the circuit for the motor 19 which turns the drive shaft 12. Another is in the circuit of the motor which turns the shaft 50. Still another is in the circuit of the motor 116 which turns the sprocket 68. Thus, when the microswitch is actuated the machine immediately stops.

It thus will be seen that I have provided an apparatus which achieves the various objects of my invention and are well adapted to meet the conditions of practical use.

As various possible embodiments might be made of the above invention and as various changes might be made in the embodiment above set forth, it is to be understood that all matter herein described or shown in the accompanying drawings is to be interpreted as illustrative and not in a limiting sense.

I claim:

[1. In an apparatus of the character described for applying a comestible paste layer to a comestible wafer, the combination of: means for advancing a series of wafers at a predetermined speed and in predetermined spaced relationship along a predetermined path of travel, and a paste applicator comprising a cylindrical member mounted for rotation about a horizontal axis and having a hollow interior and a plurality of passageways leading from said interior to outer terminals on angularly spaced sections of the periphery of the member, said member being located above the path of travel of the wafers, means for rotating said member about said axis, the speed and direction of travel of the periphery of the member being such that the outer terminals of successive passageways are above and synchronized with successive moving wafers when the outer terminal of each passageway is lowermost, means for intermittently expressing paste from the interior of said member into each of said passageways successively so that paste intermittently is extruded from the outer terminals of said successive passageways, and cutting means for severing the extruded paste at the lowermost outer terminal of said member as said terminal passes over a moving wafer so as to deposit paste as a layer on said wafer.]

[2. A combination as set forth in claim 1 wherein the means for cutting extruded paste from the cylindrical member comprises a wire bearing against the lowermost portion of the cylindrical member.]

[3. A combination as set forth in claim 2 wherein a frame is provided for supporting the wire and wherein means is included to bias the frame against the lowermost portion of the cylindrical member.]

[4. In an apparatus of the character described for applying a plastic comestible to an object, the combination of: means for advancing the object along a predetermined path of travel, and a comestible applicator comprising a cylindrical member mounted for rotation about a horizontal axis and having a hollow interior and a plurality of passageways leading from said interior to outer terminals on angularly spaced sections of the periphery of the member, said member being located above the path of travel of the moving object, means for rotating said member about said axis, means for forcing plastic comestible under pressure from the interior of said member into said passageways so that comestible is extruded from the outer terminals of the passageways, and cutting means for severing the extruded comestible at the lowermost outer terminal of said member as said terminal passes over the moving object so as to deposit the comestible as a layer thereon.]

*5. In an apparatus of the character described for applying a plastic comestible to an object, the combination of: means for advancing the object along a predetermined path of travel, and a comestible applicator, said applicator comprising a hopper, a tubular horizontal stationary cylindrical member having an open end and a closed end, said member having a hollow unobstructed interior, conduit means connecting the hopper to the open end of the cylindrical member, a circular extrusion plate having a central opening received rotatably on the horizontal cylindrical member so as to mount said plate for rotation about the horizontal axis of said member, said cylindrical member having a lateral through opening therein remote from the bottom of said member for leading the plastic comestible from the interior to the exterior of said member, said plate being located on and covering the portion of said cylindrical member which includes said lateral opening, said plate having a plurality of passageways leading from the central opening of said plate to outer terminals on angularly spaced sections of the periphery of the plate, the inner terminals of said passageways sweeping in succession over said lateral opening, said plate being located above the path of travel of the moving object, means for rotating said plate about said horizontal axis, said conduit means including means for forcing plastic comestible under pressure from the hopper into the unobstructed interior of the hollow cylindrical member through the open end thereof and then through the lateral opening in the cylindrical member into said passageways in succession when the outer terminals of the passageways are remote from their lowermost position, so that plastic comestible is extruded from the outer terminals of the passageways while the outer terminals are removed from their lowermost position, and cutting means for severing the extruded comestible at the lowermost outer terminal of said plate as said terminal passes over the moving object so as to deposit the comestible as a layer thereon.*

*6. A combination as set forth in claim 5 wherein the means for advancing the object along a predetermined path of travel advances a series of objects along said path at a predetermined speed and in predetermined spaced relationship, and wherein the speed and direction of travel of the periphery of the circular extrusion plate is such that the outer terminals of successive passageways are above*

*and synchronized with successive moving objects when the outer terminal of each passageway is lowermost.*

References Cited in the file of this patent or the original patent

UNITED STATES PATENTS

| | | |
|---|---|---|
| 820,388 | Carter | May 15, 1906 |
| 1,879,951 | Roehl | Sept. 27, 1932 |
| 2,356,853 | Keller | Aug. 29, 1944 |
| 2,394,795 | Manspeaker | Feb. 12, 1946 |
| 2,520,493 | Curlee | Aug. 29, 1950 |
| 2,657,646 | Derbyshire et al. | Nov. 3, 1953 |
| 2,846,960 | Govatsos | Aug. 12, 1958 |

FOREIGN PATENTS

| | | |
|---|---|---|
| 161,396 | Australia | Feb. 22, 1955 |